United States Patent
Hrovat et al.

(10) Patent No.: US 6,671,587 B2
(45) Date of Patent: Dec. 30, 2003

(54) VEHICLE DYNAMICS MEASURING APPARATUS AND METHOD USING MULTIPLE GPS ANTENNAS

(75) Inventors: Davorin David Hrovat, Ann Arbor, MI (US); Hongtei Eric Tseng, Canton, MI (US); John Loring Yester, Bloomfield Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/683,707

(22) Filed: Feb. 5, 2002

(65) Prior Publication Data

US 2003/0149512 A1 Aug. 7, 2003

(51) Int. Cl.[7] .............................. G01C 21/00; G01S 1/00
(52) U.S. Cl. ........................ 701/1; 701/213; 342/357.06
(58) Field of Search .............................. 701/1, 47, 207, 701/213, 214, 215; 342/357.01, 357.05, 357.06, 357.12; 303/140

(56) References Cited

U.S. PATENT DOCUMENTS

| | | | |
|---|---|---|---|
| 5,101,356 A | 3/1992 | Timothy et al. | 364/449 |
| 5,349,531 A | 9/1994 | Sato et al. | 364/449 |
| 5,598,166 A | 1/1997 | Ishikawa et al. | 342/357 |
| 5,657,025 A | 8/1997 | Ebner et al. | 342/357 |
| 5,903,236 A | 5/1999 | Lawrence | 342/357 |
| 5,933,110 A | 8/1999 | Tang et al. | 342/357 |

OTHER PUBLICATIONS

"VCD, The Vehicle Dynamics Control System of Bosch," by A. van Zanten, R. Erhardt, and G. Pffaff, SAE 9507 Detroit, MI Feb. 27–Mar. 2, 1995, pp. 9–26.

*Primary Examiner*—Gary Chin
(74) *Attorney, Agent, or Firm*—Gregory P. Brown

(57) ABSTRACT

An apparatus and method for measuring dynamic movement of a vehicle (10) by employing multiple GPS satellites and determining velocity based change in the carrier frequency of multiple satellite signals. The apparatus includes at least two GPS receiving antennas (12a and 12b) installed on a vehicle (10) at known locations and a controller (20) for processing received GPS signals (16a–16c) and monitoring a carrier frequency associated with the GPS signals. The controller (20) determines a change in the carrier frequency of the GPS signals due to Doppler effect. The controller (20) further determines a first inertial velocity vector of each of the receiving antennas (12a and 12b) based on the change in carrier frequency, and determines angular rate of the vehicle based on the inertial velocity vectors. The controller (20) further determines vehicle longitudinal and lateral velocity and acceleration as a function of the inertial velocity vectors.

20 Claims, 7 Drawing Sheets

VEHICLE DYNAMICS MEASURING APPARATUS AND METHOD USING MULTIPLE GPS ANTENNAS

BACKGROUND OF INVENTION

The present invention generally relates to monitoring dynamic motion of a vehicle and, more particularly, relates to an apparatus and method for measuring vehicle velocities using a plurality of on-board global positioning system (GPS) receiving antennas.

Automotive vehicles are commonly equipped with multiple sensing devices for sensing dynamic movement of the vehicle and generating output signals indicative of the sensed movement. The sensed vehicle dynamics output signals are typically made available to various on-board vehicle control systems to further enhance the vehicle driving performance. Advanced vehicle dynamics control systems, including active suspension control, traction control, and brake control systems, often employ sensed vehicle dynamics information such as roll angle, pitch angle, yaw rate, roll rate, pitch rate, lateral and longitudinal velocity, lateral and longitudinal acceleration, tire slip, tire slip rate, and other sensed vehicle parameters. Given a variety of sensed vehicle dynamics measurements, the vehicle dynamic control systems are able to adaptively adjust the vehicle ride, such as providing enhanced vehicle tilt control.

The above-mentioned and other vehicle dynamics parameters are generally sensed using various conventional sensors, some of which are costly and complex, and others of which suffer from noise and bias errors. Many commercially available angular yaw rate, roll rate, and pitch rate sensors exhibit inherent voltage drift/bias problems and, thus, require the additional use of drift compensation circuitry to compensate for the presence of drift error. The requirement of drift compensation circuitry further adds to the cost and complexity of the sensor. The use of a large number of such sensors can significantly add to the overall cost of the vehicle.

Accordingly, it is therefore desirable to provide for a vehicle dynamics sensing approach for sensing certain vehicle dynamics parameters in a manner that achieves cost affordable sensing. In particular, it is desirable to provide for a vehicle dynamics sensing approach that senses angular rate of change of the vehicle, such as roll rate, pitch rate, and yaw rate, and does not require the use of expensive drift compensation circuitry. It is also desirable to provide for a cost affordable vehicle dynamic sensing approach that senses inertial velocity and acceleration of the vehicle. It is further desirable to provide for a sensing approach that may complement existing sensors within the vehicle to provide for enhanced vehicle dynamics sensing at a low cost.

SUMMARY OF INVENTION

The present invention provides for an apparatus and method for measuring dynamic movement of a vehicle by employing multiple GPS signals and determining velocity based on a change in the carrier frequency due to Doppler effect to achieve a cost-effective vehicle dynamics measurement. According to one aspect of the present invention, the apparatus includes a first receiving antenna installed on a vehicle at a first known location for receiving GPS signals broadcast from multiple GPS transmitters, and a second receiving antenna installed on the vehicle at a second known location for receiving the GPS signals. The second receiving antenna is arranged on the vehicle at a predetermined distance from the first receiving antenna. The apparatus further has a controller for processing the GPS signals received by the first and second receiving antennas and monitoring a carrier frequency associated with each of the received GPS signals. A change in the carrier frequency of the GPS signals based on Doppler effect is determined. The controller further determines a first inertial velocity vector (i.e., velocity vector in an inertial coordinate) for the first antenna and a second inertial velocity vector for the second antenna based on the changes in the carrier frequency, and further determines an angular rate of the vehicle based on the first and second inertial velocity vectors.

According to another aspect of the present invention, an apparatus and method for measuring vehicle inertial velocity using GPS signals is provided. The apparatus includes a first receiving antenna installed on a vehicle at a first known location for receiving GPS signals broadcast from multiple GPS transmitters, and a second receiving antenna installed on the vehicle at a second known location for receiving the GPS signals. The second receiving antenna is arranged on the vehicle at a predetermined distance from the first receiving antenna. The apparatus further includes a controller for processing the received GPS signals received from the first and second receiving antennas and monitoring a carrier frequency associated with the received GPS signals. The controller determines a change in the carrier frequency of the GPS signals due to Doppler effect. The controller further determines a first inertial velocity vector for the first antenna, and a second inertial velocity vector for the second antenna, based on the change in carrier frequency. The controller obtains a vehicle heading and determines at least one of longitudinal and lateral velocity vectors of the vehicle as a function of the first and second inertial velocity vectors and the vehicle heading.

These and other features, advantages and objects of the present invention will be further understood and appreciated by those skilled in the art by reference to the following specification, claims and appended drawings.

BRIEF DESCRIPTION OF DRAWINGS

The present invention will now be described, by way of example, with reference to the accompanying drawings.

DETAILED DESCRIPTION

Figure 1:
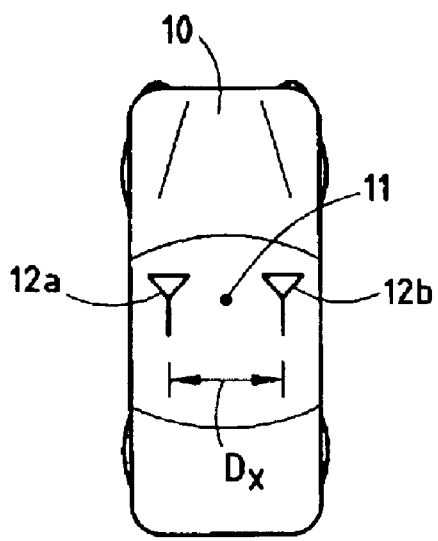
FIG. 1 is a top view of a vehicle equipped with two global positioning system (GPS) receiving antennas, according to one embodiment of the present invention.
Figure 2:
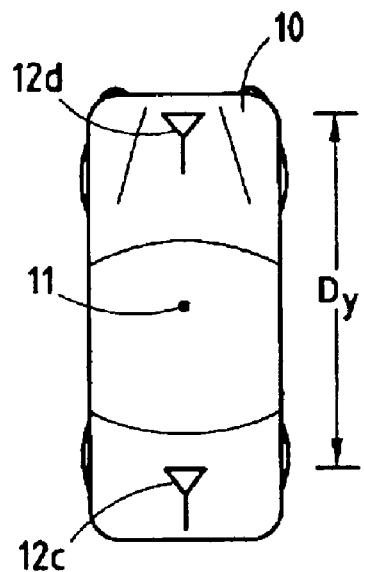
FIG. 2 is a top view of a vehicle equipped with two GPS receiving antennas, according to a second embodiment of the present invention.
Figure 3:
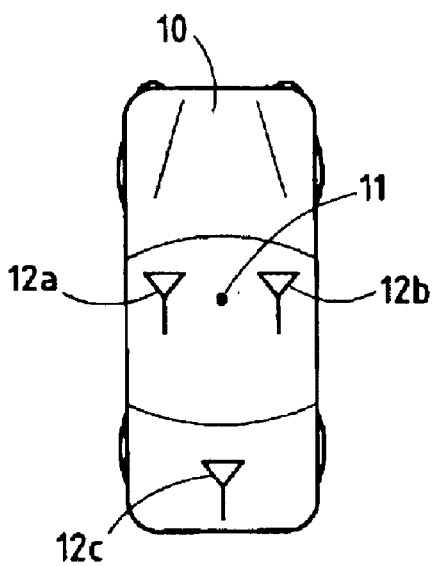
FIG. 3 is a top view of a vehicle equipped with three GPS receiving antennas, according to a third embodiment of the present invention.

Referring to FIGS. 1–3, a wheeled automotive vehicle 10 is generally shown having a plurality of GPS receiving antennas installed on the rigid body of the vehicle 10 at known locations, arranged according to three exemplary embodiments. The GPS receiving antennas are mounted on the rigid vehicle body, such that the antennas are exposed to GPS RF signals broadcast from multiple GPS satellites. A plurality of received GPS RF signals are decoded and processed to obtain accurate position and time information. The present invention further monitors the carrier frequency of multiple GPS RF signals received by a plurality of GPS receiving antennas to determine vehicle dynamics information including vehicle angular yaw rate, roll rate, and pitch rate, and lateral and longitudinal inertial velocity and acceleration of the vehicle.

The embodiment shown in FIG. 1 has first and second GPS receiving antennas 12a and 12b arranged side-by-side along the lateral axis (X-axis) of the vehicle 10. Antennas 12a and 12b are separated from each other in the lateral axis and horizontal plane by a known fixed distance $D_x$, and are located such that the center of gravity 11 of the vehicle 10 is substantially midway between antennas 12a and 12b. This arrangement of two antennas 12a and 12b along the lateral axis (X-axis) of the vehicle allows for the determination of vehicle yaw rate (i.e., angular rate of change of the vehicle about an axis perpendicular to the plane formed by the X-axis and Y-axis) and vehicle roll rate information (i.e., angular rate of change of the vehicle about the longitudinal axis (Y-axis)).

The embodiment shown in FIG. 2 has two GPS receiving antennas 12c and 12d arranged near the front and back of the vehicle 10 along the longitudinal axis (Y-axis) of vehicle 10. Antennas 12c and 12d are separated from each other in the longitudinal axis and horizontal plane by a known fixed distance $D_y$, and are arranged so that the center of gravity 11 of vehicle 10 is substantially midway between antennas 12c and 12d. This arrangement of two antennas 12c and 12d along the longitudinal axis (Y-axis) of the vehicle 10 allows for the determination of vehicle yaw rate (i.e., angular rate of change of the vehicle about an axis perpendicular to the plane formed by the X-axis and Y-axis) and vehicle pitch rate information (i.e., angular rate of change of the vehicle about the lateral axis (X-axis)).

The embodiment shown in FIG. 3 has three GPS receiving antennas 12a, 12b, and 12c arranged on the vehicle 10. Alternately, vehicle 10 could employ GPS receiving antennas 12a, 12b, and 12d, or could employ all four GPS receiving antennas 12a–12d, mounted as described above. By employing at least three or four GPS receiving antennas, all three of the vehicle yaw rate, roll rate, and pitch rate can be determined according to the present invention. It should be appreciated that additional GPS receiving antennas and alternate antenna locations may be employed, without departing from the teachings of the present invention.

Figure 4:
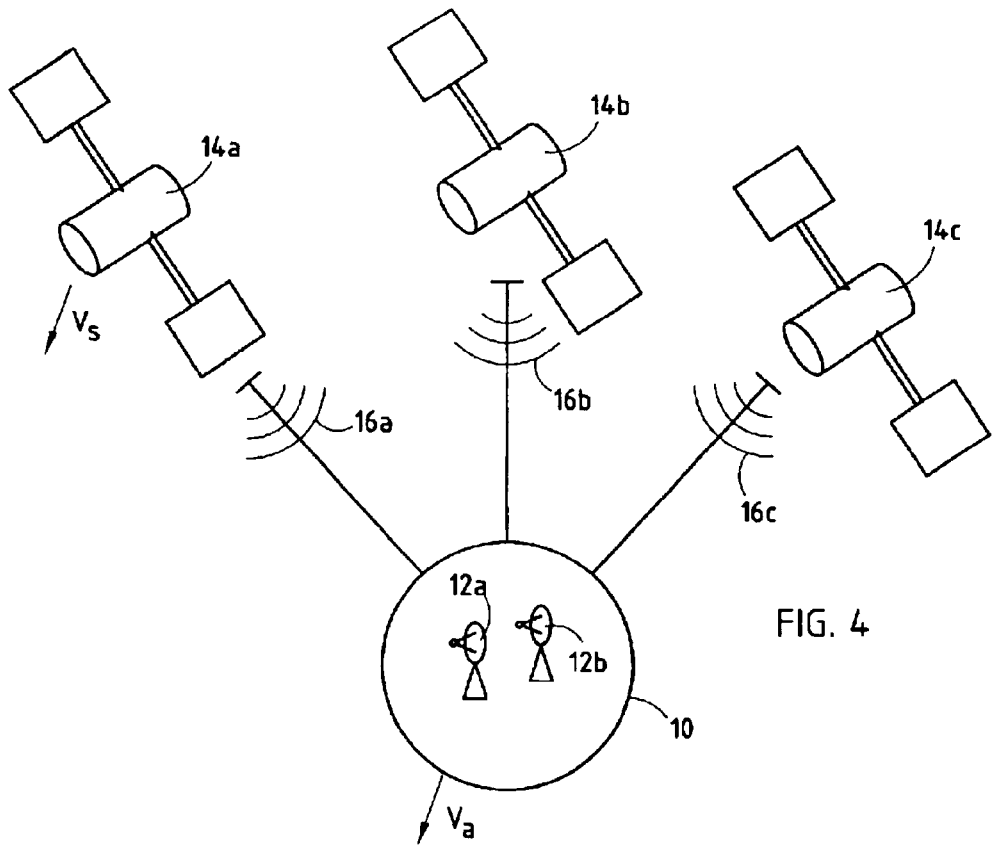
FIG. 4 is a schematic diagram illustrating GPS satellites (transmitters) broadcasting signals to two GPS receiving antennas on a vehicle.

Referring to FIG. 4, GPS receiving antennas 12a and 12b are shown on a vehicle moving at velocity Va and receiving broadcast GPS RF signals 16a–16c broadcast from GPS transmitters, shown and described herein as conventional GPS satellites 14a–14c, respectively. The global positioning system is well recognized and readily understood by those skilled in the art for providing accurate position information. Currently, the global positioning system comprises a constellation of twenty-four (24) satellites orbiting the Earth. Each GPS satellite broadcasts RF signals containing a predetermined carrier frequency and a modulated frequency carrying encoded data. Currently, the predetermined carrier frequency is the same for all satellites and is available on two L-band frequencies: L1=1575.42 MHz and L2=1227.6 MHz. Each satellite encodes data using one or more satellite-specific pseudo random noise (PRN) ranging codes. The encoded data typically includes a navigation message containing orbital position of the satellite, time of day, and other information.

Figure 5:
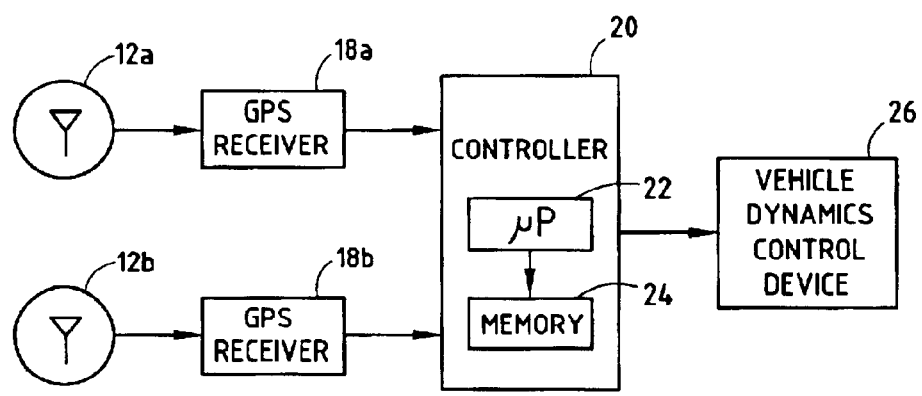
FIG. 5 is a block diagram illustrating a control system coupled to first and second GPS receiving antennas for determining vehicle dynamics signals.

The GPS receiving antennas 12a and 12b receive the GPS RF signals from at least three GPS satellites and pass the received GPS signals to GPS receivers 18a and 18b, respectively, as shown in FIG. 5. Receivers 18a and 18b decode the modulated data to obtain the navigation message and further monitor the carrier frequency to determine a change in the carrier frequency due to Doppler effect which is caused by a relative velocity difference between a GPS satellite and the receiving GPS antenna, as explained herein. The navigation message data received from the GPS antennas 12a and 12b enable the receivers 18a and 18b to identify which satellites are visible (i.e., receiving signals therefrom) and their orbital locations (within allowable GPS accuracy). This allows the GPS receivers 18a and 18b to determine the location of each antenna 12a and 12b on the surface of the Earth. The process by which the GPS receivers 18a and 18b process the navigation message to determine position and time information may include conventional GPS processing techniques that should be readily apparent to those in the art. The measuring dynamic apparatus and method of the present invention may employ GPS, differential GPS (DGPS), kinematic DGPS, as well as any other variations of GPS.

The GPS receivers 18a and 18b further determine the inertial velocity vector of each of GPS antennas 12a and 12b, respectively, by monitoring the GPS signal carrier frequency and determining linear velocity of each antenna based on change in the carrier frequency (i.e., frequency shift) due to Doppler effect. The inertial velocity is the velocity vector in the inertial coordinate. As each GPS antenna moves closer to a particular GPS satellite, the carrier frequency received from that particular satellite increases in frequency. Similarly, as the GPS antenna moves away from a particular GPS satellite, the carrier frequency received from that particular satellite decreases in frequency. Thus, relative speeds between each of the GPS receiving antennas 12a and 12b and each visible GPS satellite can be obtained.

The inertial velocity vectors for each of antennas 12a and 12b and the satellite navigation message based information are input into a controller 20 having a conventional microprocessor 22 and memory 24. A software routine stored in memory 24 is performed by microprocessor 22 to provide a method of determining vehicle dynamics information including vehicle longitudinal and lateral velocity and acceleration, yaw rate, roll rate, pitch rate, yaw angle, roll angle, and pitch angle, as described herein. The determined vehicle dynamics information is made available as an output to one or more vehicle dynamics control devices 26, such as the suspension control system and brake control system, as examples. While separate first and second GPS receivers 18a and 18b and microprocessor-based controller 20 are shown and described herein, it should be appreciated that one or more analog and/or digital controllers may be employed to process the GPS signals and determine the vehicle dynamics information.

Figure 6:
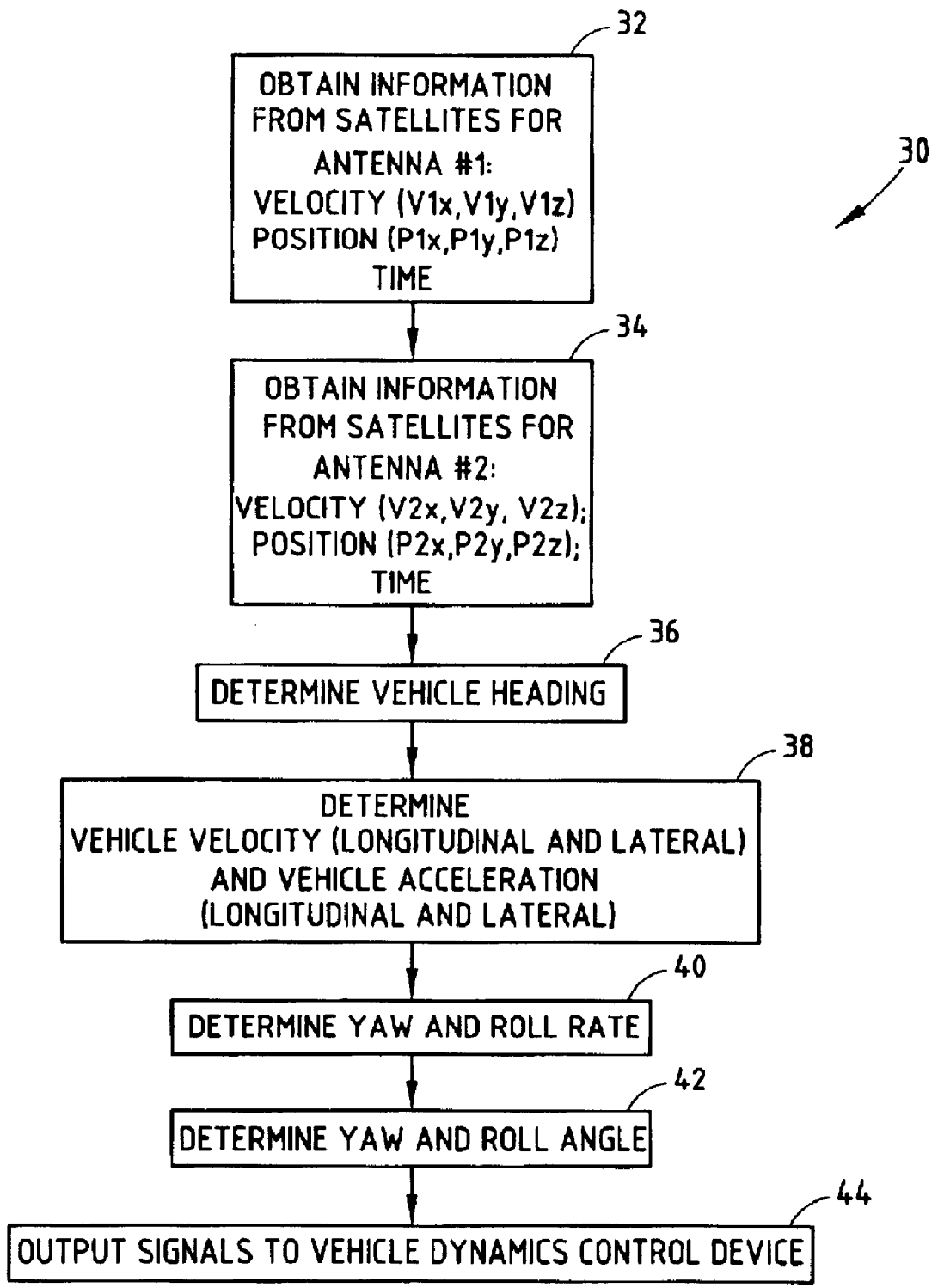
FIG. 6 is a flow diagram illustrating a method of determining vehicle dynamics signals based on GPS signals received by multiple GPS receiving antennas.

A control methodology 30 for determining the vehicle dynamics information is shown in FIGS. 6–10. With particular reference to FIG. 6, methodology 30 includes step 32 which obtains information from multiple satellites for antenna #1 (12a). The information obtained includes the antenna inertial velocity vector (V1x, V1y, V1z), the antenna position coordinates (P1x, P1y, P1z), and the time of day that the signal information was obtained. Methodology 30 includes a similar step 34 which obtains information for antenna #2 (12b), including the antenna inertial velocity vector (V2x, V2y, V2z), the antenna position coordinates (P2x, P2y, P2z), and the time of day that the signal information was obtained.

Figure 7:
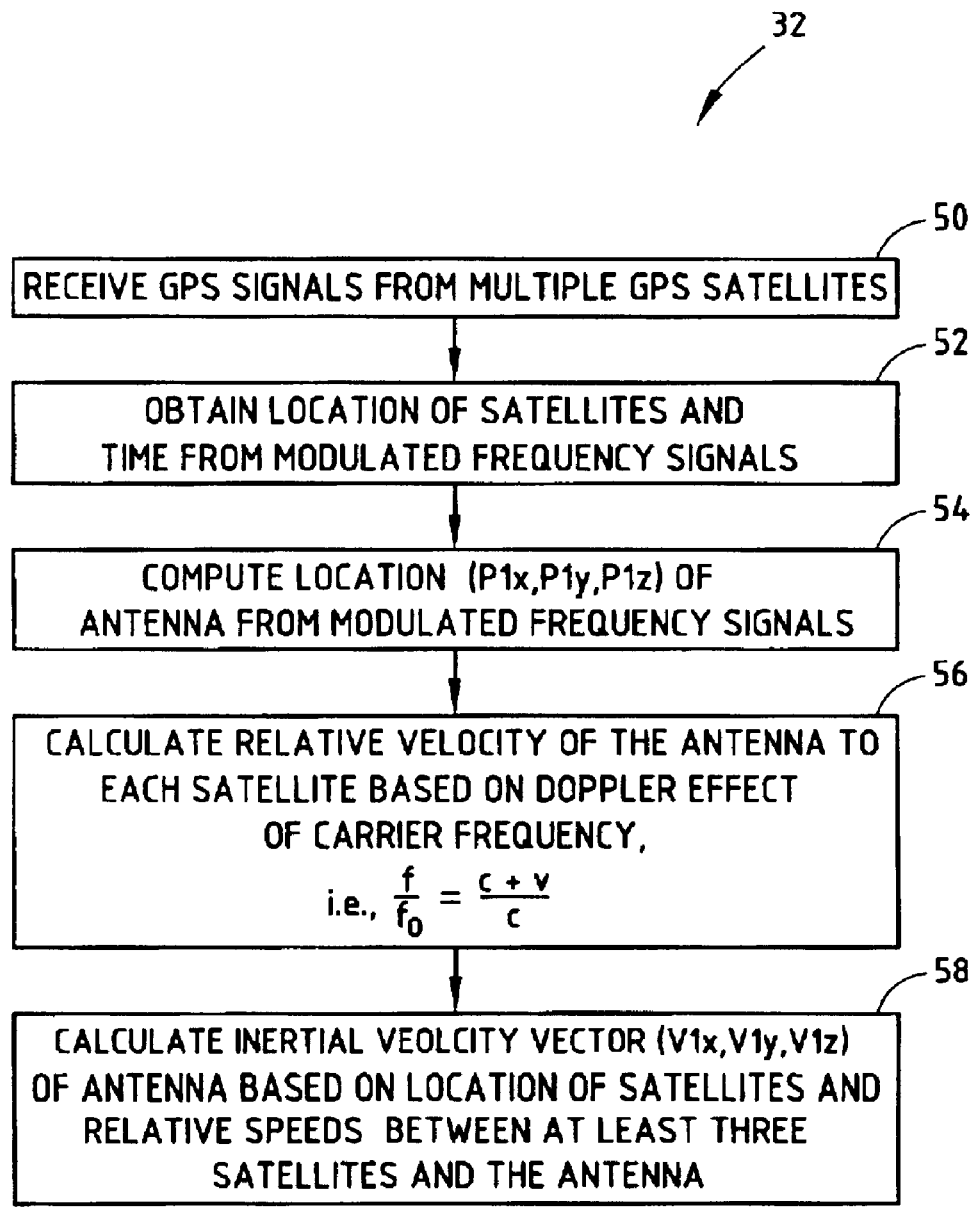
FIG. 7 is a flow diagram illustrating the steps of calculating velocity, position and time for one of the receiving antennas.

The method for performing step 32 of obtaining information for antenna #1 (12a) is shown in greater detail in FIG. 7 and described below. It should be appreciated that step 34 of obtaining information for antenna #2 (12b) is substantially identical to step 32 and, thus, is not described herein in greater detail. Step 32 includes step 50 of receiving GPS signals from multiple GPS satellites. According to one embodiment, GPS signals from at least three different satellites are required to enable accurate calculation of the inertial velocity vector for each receiving antenna. Next, in step 52, data including the location of each satellite broadcasting a received GPS signal and the time of day are obtained from the navigation message encoded in the modulated frequency signals associated with the GPS signals. In step 54, the longitudinal, lateral, and altitudinal location (i.e., position) is computed in three-dimensional coordinates to provide position coordinates P1x, P1y, P1z indicative of the position of the receiving antenna. Computation of the position information is computed by conventional processing of the modulated frequency GPS signals as is well-known in the art.

In step 56, the velocity of each antenna relative to each of the satellites is calculated based on changes in carrier frequency due to Doppler effect in step 56. The velocity of each antenna relative to each of the satellites can be computed based on the frequency change of the carrier frequency associated with the received GPS signals. The carrier frequency of the received GPS signals varies when the antenna is moving faster or slower relative to each satellite. The Doppler effect can be represented by the equation shown in step 56, where $f_0$ is the fixed/publicized GPS carrier frequency associated with the transmit signals from the satellites, f is the frequency observed by the antenna, c is the speed of light (or electromagnetic wave), and v is the relative speed between the satellite and the receiving antenna. According to one embodiment, given $c=0.3\times10^9$ m/s, $f_0$=1575.42 MHz (L1) and 1227.6 MHz (L2), the resolution of the speed calculated can be within 0.2 m/s if f is obtained in integer format. In step 58, the inertial velocity vector V1x, V1y, V1z of the antenna is calculated based on location of each of the satellites and the relative speeds between each of the at least three satellites and the receiving antenna. Thus, inertial velocity of each antenna is calculated based on the change in the received carrier frequency of the GPS signals transmitted from individual satellites, instead of employing the position information provided in the modulated signal. By using change in the received carrier frequency due to Doppler effect to calculate inertial velocity, the present invention provides for high precision and quick velocity measurements which do not suffer from accuracy and latency problems generally associated with the modulated GPS navigation data.

Referring back to FIG. 6, methodology 30 also includes step 36 of determining the vehicle heading (forward direction of the vehicle). The vehicle heading can be calculated based on the known separation distance between the first and second antennas and the location of the first and second antennas on the vehicle. It should also be appreciated that vehicle heading could alternately be determined by an external sensing source, such as a compass which is typically installed into many vehicles.

Methodology 30 then proceeds to step 38 to determine vehicle longitudinal and lateral velocity and vehicle longitudinal and lateral acceleration. Methodology 30 further determines yaw rate and roll rate of the vehicle in step 40, and determines vehicle yaw angle and roll angle in step 42. The various vehicle dynamics parameters determined by methodology 30 may then be made available as to various vehicle dynamics control devices, as shown in step 44.

Figure 8:
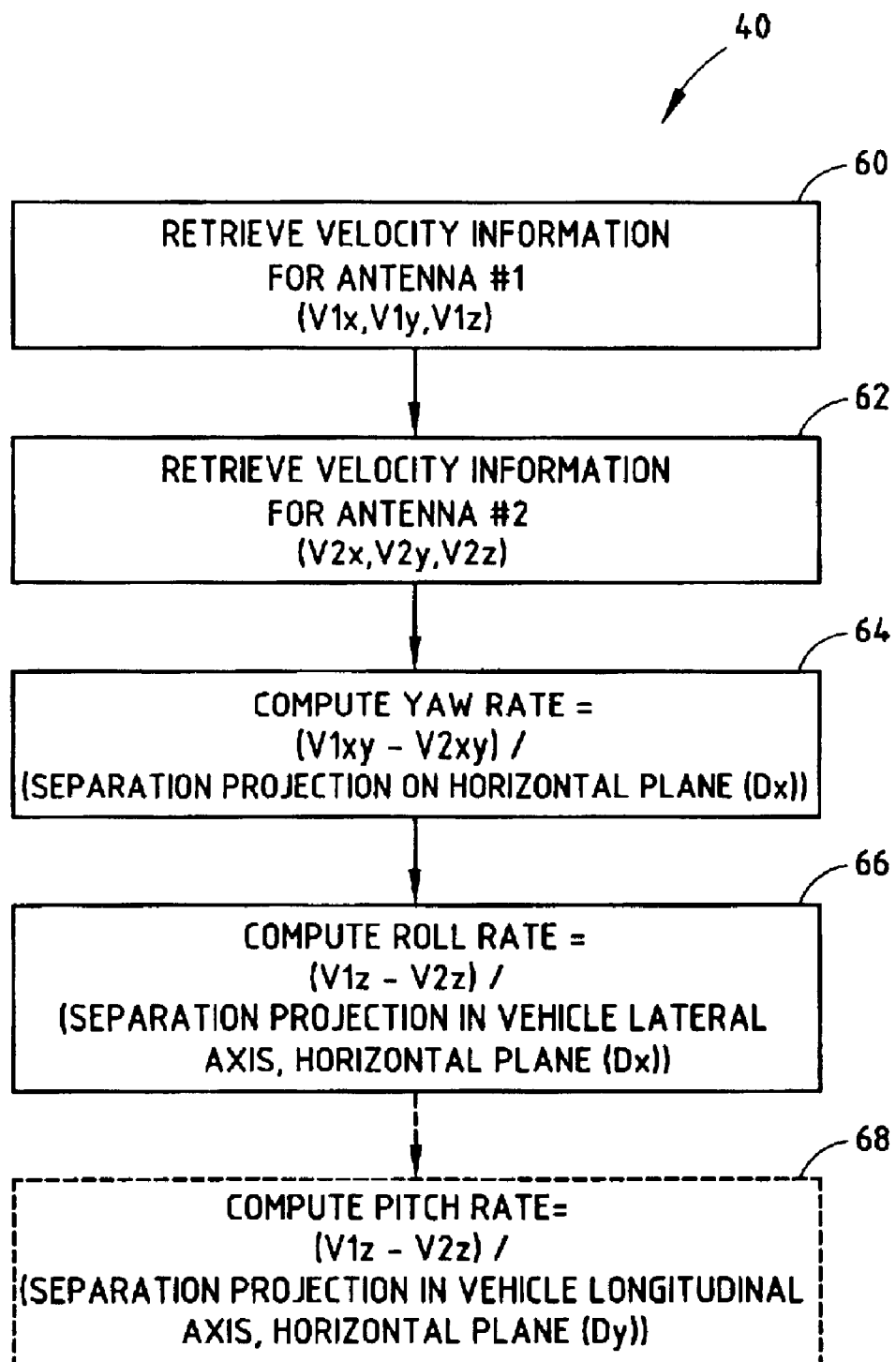
FIG. 8 is a flow diagram illustrating the steps of determining vehicle yaw, roll and pitch rates as a function of the antenna velocity vectors.

Referring to FIG. 8, step 40 of methodology 30 is further shown including step 60 of retrieving velocity information (V1x, V1y, V1z) for the first GPS receiving antenna #1, and step 62 of retrieving velocity information (V2x, V2y, V2z) at the same time for the second receiving antenna #2. Next, in step 64, the vehicle yaw rate is computed as a function of the difference between the first and second inertial velocities of the first and second antennas projected onto the horizontal XY plane (rotated about the Z-axis) divided by distance $D_x$ (the separation projection in the horizontal plane between the first and second antennas). In step 66, the vehicle roll rate is computed as a function of the difference in velocity of the first and second antennas in a direction along the Z-axis divided by distance $D_x$ (separation projection and vehicle lateral axis along the horizontal plane). Also shown in dashed lines is optional step 68 which computes the vehicle pitch rate as a function of the difference in velocity of the first and second antennas about the Z-axis divided by distance $D_y$ (separation projection and vehicle longitudinal axis about the horizontal plane). The pitch rate computation is available when the first and second antennas are mounted along the longitudinal axis, such as at front and rear locations on the vehicle.

Figure 9:
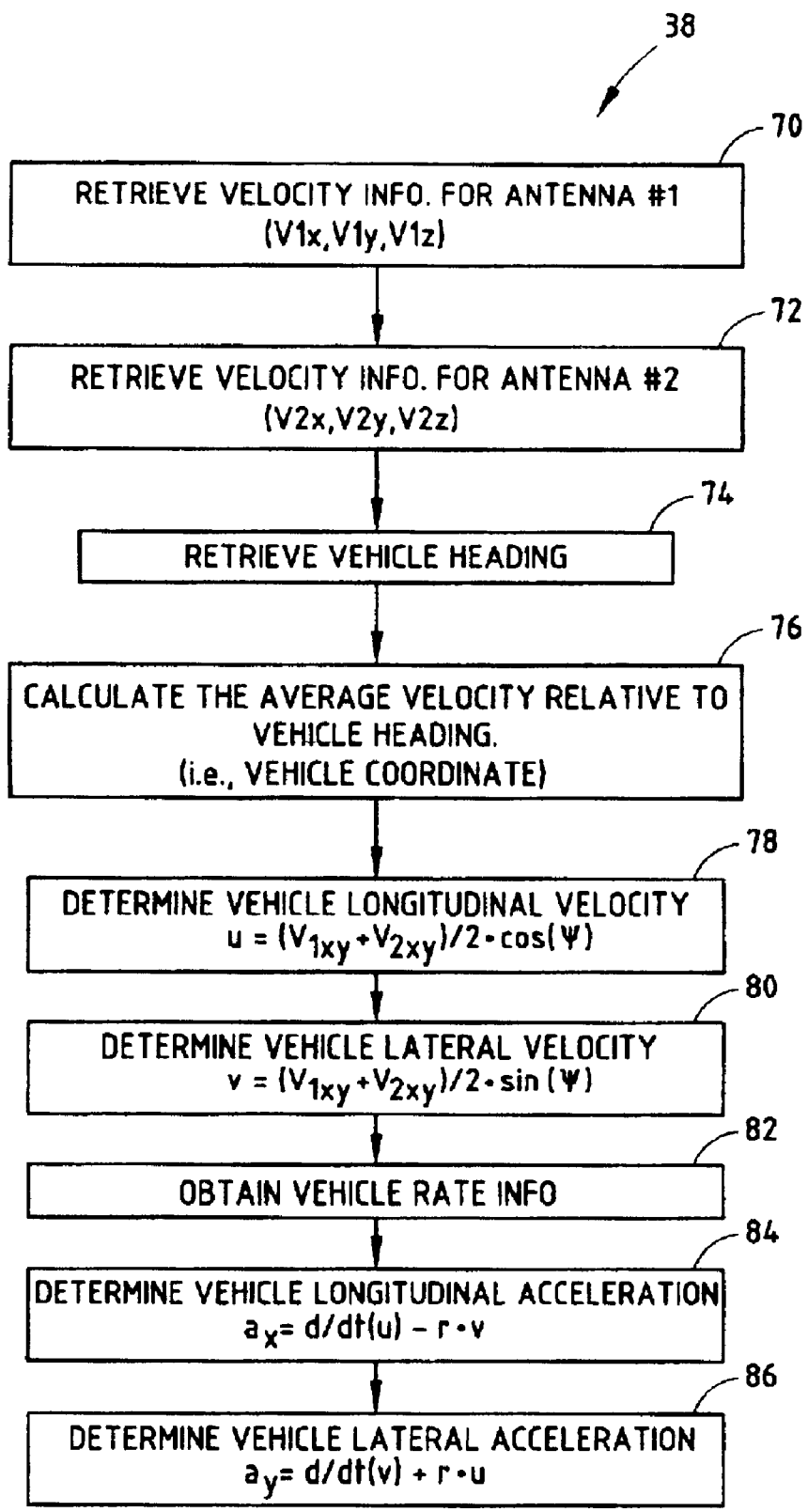
FIG. 9 is a flow diagram illustrating the steps of determining longitudinal and lateral velocity and acceleration of the vehicle.

Referring to FIG. 9, step 38 of determining vehicle velocity and acceleration about both the longitudinal and lateral axes of the vehicle is further illustrated in detail. Included is step 70 of retrieving velocity information (V1x, V1y, V1z) for the first receiving antenna #1, and step 72 of retrieving velocity information (V2x, V2y, V2z) at the same time for the second receiving antenna #2. The vehicle heading information is retrieved in step 74. In step 76, the average velocity relative to the vehicle heading is calculated. In step 78, the vehicle longitudinal velocity u is determined according to the equation shown, where $V_{1xy}$ is the XY plane component of antenna velocity $V_1$ (i.e., the projection of $V_1$ on the surface of the Earth), $V_{2xy}$ is the XY plane component of antenna velocity $V_2$, and $\psi$ is the angle between the vehicle heading and the velocity vector which is determined by the average velocity of vectors $V_{1xy}$ and $V_{2xy}$. In step 80, the vehicle lateral velocity v is determined based on the equation shown. In step 82, the vehicle rate information is also obtained. In step 84, the longitudinal acceleration $a_x$ is determined based on the equation shown, where u is the longitudinal velocity, v is the lateral velocity, and r is the vehicle yaw rate of the vehicle. In step 86, the lateral acceleration $a_y$ of the vehicle is determined based on the equation shown. Accordingly, both longitudinal and lateral vehicle velocity and acceleration are determined as a function of the inertial velocity vectors for two GPS receiving antennas.

Figure 10:
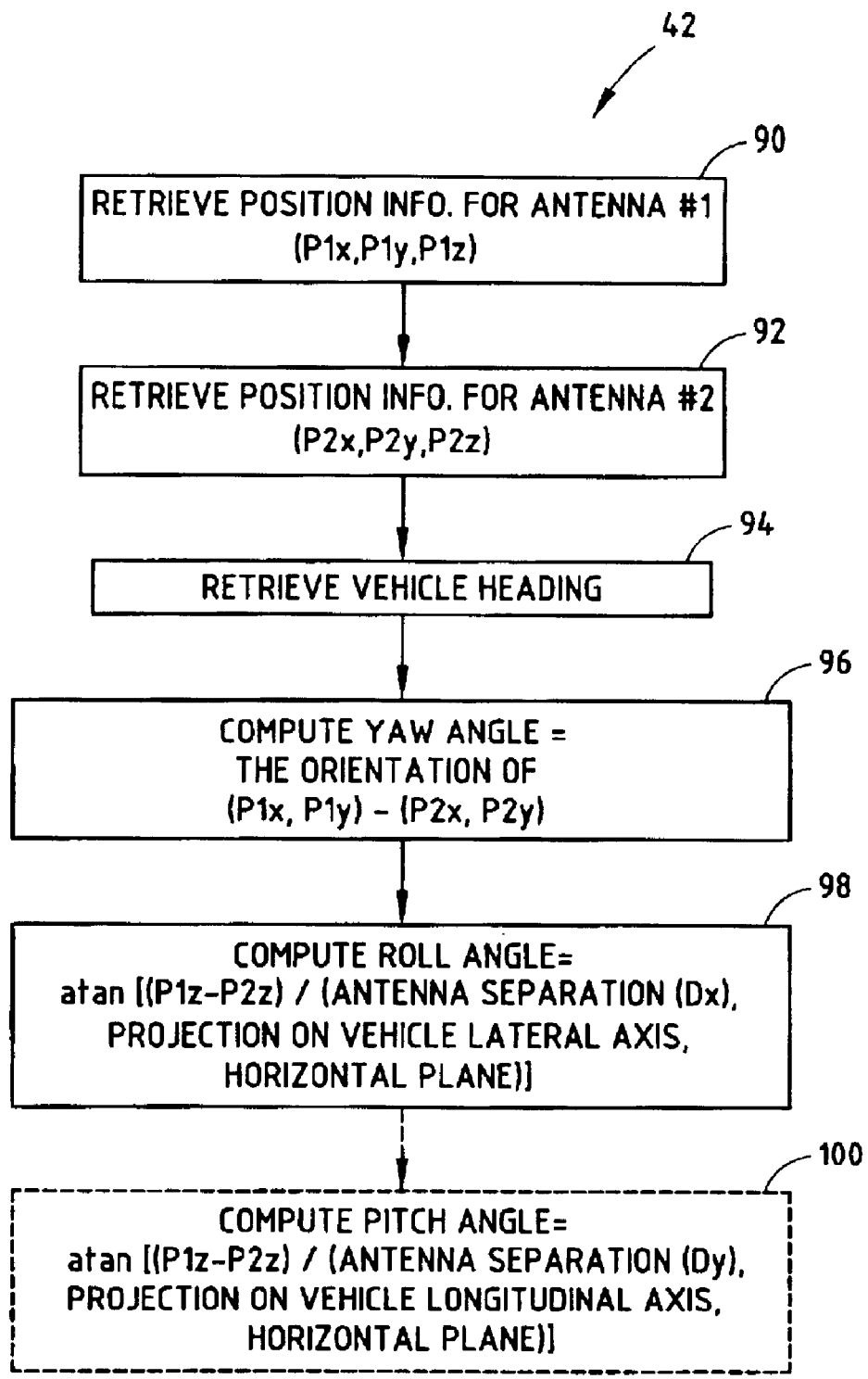
FIG. 10 is a flow diagram illustrating the steps of determining yaw, roll, and pitch angle of the vehicle.

Methodology 30 further determines yaw and roll angle of the vehicle in step 42, which is further shown in detail in FIG. 10. Position information (P1x, P1y, P1z) for the first receiving antenna #1 is retrieved in step 90, and position information (P2x, P2y, P2z) for the second receiving antenna #2 at the same time is retrieved in step 92. The vehicle heading information is also retrieved in step 94. In step 96, the yaw angle of the vehicle is computed as a function of the orientation of the difference in position of the first and second GPS receiving antennas in the X and Y position coordinates. In step 98, the roll angle is computed as a function of the arctangent of the difference in altitude of the first and second GPS receiving antennas divided by the antenna separation distance $D_x$ (projection of vehicle lateral axis about the horizontal plane). Also shown is optional step 100 of computing a pitch angle as a function of the arctangent of the difference in the altitude positions of the first and second GPS receiving antennas divided by the antenna separation distance $D_y$ (projection on vehicle longitudinal axis about the horizontal plane). The pitch angle computation is available when the first and second GPS receiving antennas are located on the longitudinal axis, such as near the front and rear of the vehicle.

Accordingly, the vehicle dynamics measuring apparatus and method of the present invention advantageously determines vehicle dynamics information based on multiple GPS signals received by multiple receiving antennas installed on the vehicle, particularly by monitoring change in frequency of the carrier frequency of the GPS signals due to the Doppler effect. Thus, the present invention is able to measure angular attitude rate of the vehicle, such as roll, pitch, and yaw rate, and is further able to compute lateral and longitudinal velocity and acceleration of the vehicle. The vehicle dynamics measurements achieved with the present invention provide accurate and quick measurements which are not limited to the global positioning system position information accuracy and do not suffer from other accuracy, latency, and recovery time issues otherwise present in other known systems.

By using Doppler-based information for determining velocity calculations, in contrast to using the GPS positional data, a number of advantages are realized including higher bandwidth (faster updates and acquisitions) and higher accuracy (finer granularity of data). When considering a single GPS satellite, the information encoded in the GPS data stream is updated at about 30 Hz which therefore restricts the maximum update to this rate. The GPS carrier frequency which exceeds one gigahertz and can be measured several orders of magnitude faster and with greater precision. Additionally, taking the computational latency necessary for computing a three degrees of freedom system of equations that must be solved in order to obtain velocity information from encoded GPS data compared to the computation requirements for using the carrier frequency Doppler shift requiring only vector summation, the requirements for processing the carrier frequency Doppler shift are significantly lower, thus, reducing the cost of performance and utilizing the higher data rate information obtained from carrier frequency Doppler shift.

It should be appreciated that the present invention may be incorporated onto a vehicle which may already include GPS processing capability and, thus, may be cost-effectively integrated into the vehicle. While the measured vehicle dynamics information may be measured with the present invention, without requiring additional sensors, it should be appreciated that the vehicle dynamics measuring apparatus of the present invention may be integrated with other sensors, such as inertial rate sensors. In doing so, the vehicle dynamics measurement of the present invention may serve to calibrate other sensors at startup so as to remove DC bias or other error signals, and thus can complement conventional rate sensors by simplifying or eliminating the DC drift compensation circuitry. Further, it should be appreciated that other sensors may be employed in the event that insufficient GPS signals are received so as to provide for temporary signal measurements.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An apparatus for determining an angular rate of a vehicle using global positioning system (GPS) signals, said apparatus comprising:
   a first receiving antenna installed on the vehicle at a first known location, said first receiving antenna receiving GPS signals broadcast from multiple GPS transmitters;
   a second receiving antenna installed on the vehicle at a second known location for receiving the GPS signals, said second receiving antenna arranged on the vehicle at a predetermined distance from the first receiving antenna; and
   a controller processing the GPS signals received by the first and second receiving antennas, said controller monitoring a carrier frequency associated with the received GPS signals and determining a change in the carrier frequency due to Doppler effect for each of the first and second receiving antennas, said controller further determining first and second inertial velocity vectors for the respective first and second antennas based on the change in carrier frequency, and determining said angular rate of the vehicle based on the first and second inertial velocity vectors.

2. The apparatus as defined in claim 1, wherein the first and second receiving antennas are located on the vehicle along a line substantially parallel to a lateral axis of the vehicle for determining a roll rate of the vehicle.

3. The apparatus as defined in claim 1, wherein the first and second receiving antennas are located on the vehicle along a line substantially parallel to a longitudinal axis of the vehicle for determining a pitch rate of the vehicle.

4. The apparatus as defined in claim 1, wherein the first and second receiving antennas are located on the vehicle along a line substantially parallel to the lateral axis of the vehicle for determining a yaw rate of the vehicle.

5. The apparatus as defined in claim 1, wherein the controller comprises first and second receivers for processing the GPS signals received from the first and second receiving antennas, respectively, and a processor for determining the angular rate of the vehicle.

6. The apparatus defined in claim 5, wherein the first and second receivers each determine positional information based on information modulated on GPS signals.

7. The apparatus as defined in claim 1, wherein the controller determines vehicle velocity about a longitudinal axis of the vehicle as a function of the first and second inertial velocity vectors.

8. The apparatus as defined in claim 1, wherein the controller determines the velocity of the vehicle about a lateral axis of the vehicle as a function of the first and second inertial velocity vectors.

9. An apparatus for determining a velocity vector of a vehicle using GPS signals, said apparatus comprising:
   a first receiving antenna installed on the vehicle at a first known location for receiving GPS signals broadcast from multiple GPS transmitters;

a second receiving antenna installed on the vehicle at a second known location for receiving the GPS signals, said second receiving antenna arranged on the vehicle at a predetermined distance from the first receiving antenna; and a controller for processing the GPS signals received from the first and second receiving antennas and monitoring a carrier frequency associated with the received GPS signals and determining a change in the carrier frequency of the GPS signals due to Doppler effect for each of the first and second receiving antennas, said controller determining a first inertial velocity vector for the first receiving antenna and a second inertial velocity vector for the second receiving antenna based on the change in carrier frequency, said controller further obtaining a vehicle heading and determining at least one of longitudinal and lateral velocity vectors of the vehicle as a function of the first and second inertial velocity vectors and the vehicle heading.

10. The apparatus as defined in claim 9, wherein said controller obtains an angular rate of the vehicle and further determines at least one of longitudinal and lateral acceleration vectors of the vehicle as a function of the longitudinal and lateral velocity vectors and the angular rate of the vehicle.

11. The apparatus as defined in claim 9, wherein the controller further determines an angular rate signal based on the first and second inertial velocity vectors.

12. The apparatus as defined in claim 9, wherein the controller comprises first and second receivers for processing the GPS signals received from the first and second receiving antennas, respectively, and a processor for determining at least one of the longitudinal and lateral velocity vectors of the vehicle.

13. The apparatus as defined in claim 12, wherein the first and second receivers each determine positional information based on information modulated on the GPS signals.

14. A method for determining an angular rate of a vehicle using GPS signals, said method comprising the steps of:

receiving GPS signals transmitted from multiple GPS transmitters via a first receiving antenna installed on the vehicle at a first known location;

receiving the GPS signals transmitted from the multiple GPS transmitters via a second receiving antenna installed on the vehicle at a second known location, said second receiving antenna being arranged on the vehicle at a predetermined distance from the first receiving antenna;

processing the GPS signals received by the first and second receiving antennas;

monitoring a carrier frequency associated with each of the received GPS signals;

determining a change in the carrier frequency due to Doppler effect for each of the first and second receiving antennas;

determining an inertial velocity vector for each of the first and second receiving antennas based on the change in carrier frequency; and determining said angular rate of the vehicle based on the first and second inertial velocity vectors.

15. The method as defined in claim 14 further comprising the step of positioning the first and second receiving antennas on the vehicle along a line substantially parallel to a lateral axis of the vehicle for determining a roll rate of the vehicle.

16. The method as defined in claim 14 further comprising the step of positioning the first and second receiving antennas on the vehicle along a line substantially parallel to the longitudinal axis of the vehicle for determining a pitch rate of the vehicle.

17. The method as defined in claim 14 further comprising the step of positioning the first and second receiving antennas on the vehicle along a line substantially parallel to the lateral axis of the vehicle for determining a yaw rate of the vehicle.

18. A method for determining a velocity vector of a vehicle using GPS signals, said method comprising the steps of:

receiving GPS signals transmitted from multiple GPS transmitters via a first receiving antenna installed on the vehicle at a first known location;

receiving the GPS signals transmitted from the multiple GPS transmitters via a second receiving antenna installed on the vehicle at a second known location, said second receiving antenna being arranged on the vehicle at a predetermined distance from the first receiving antenna;

obtaining a vehicle heading;

processing the GPS signals received by the first and second receiving antennas;

monitoring a carrier frequency associated with each of the received GPS signals;

determining a change in the carrier frequency due to Doppler effect for each of the first and second receiving antennas;

determining a first inertial velocity vector for the first antenna and a second inertial velocity vector for the second antenna based on the change in carrier frequency for the first and second receiving antennas, respectively; and determining at least one of longitudinal and lateral velocity vectors of the vehicle as a function of the first and second inertial velocity vectors and the vehicle heading.

19. The method as defined in claim 18 further comprising the steps of:

determining an angular rate of the vehicle; and determining at least one of longitudinal and lateral acceleration vectors of the vehicle as a function of the longitudinal and lateral velocity vectors and the angular rate of the vehicle.

20. The method as defined in claim 18 further comprising the step of determining an angular rate signal based on the first and second inertial velocity vectors.

* * * * *